(12) United States Patent
Savage (10) Patent No.: US 11,288,341 B2
(45) Date of Patent: Mar. 29, 2022

(54) INFORMATION HANDLING SYSTEM LICENSE MANAGEMENT THROUGH NFC

(71) Applicant: Dell Products L.P., Round Rock, TX (US)

(72) Inventor: Marshal F. Savage, Austin, TX (US)

(73) Assignee: Dell Products L.P., Round Rock, TX (US)

(*) Notice: Subject to any disclaimer, the term of this patent is extended or adjusted under 35 U.S.C. 154(b) by 1213 days.

(21) Appl. No.: 14/709,882

(22) Filed: May 12, 2015

(65) Prior Publication Data

US 2016/0335421 A1 Nov. 17, 2016

(51) Int. Cl.
*G06F 21/10* (2013.01)
*G06Q 20/38* (2012.01)
*G06Q 20/32* (2012.01)

(52) U.S. Cl.
CPC ....... *G06F 21/105* (2013.01); *G06Q 20/3278* (2013.01); *G06Q 20/3821* (2013.01); *G06Q 2220/18* (2013.01)

(58) Field of Classification Search
USPC ...................................................... 705/50–79
See application file for complete search history.

(56) References Cited

U.S. PATENT DOCUMENTS

| | | | | |
|---|---|---|---|---|
| 6,009,520 A * | 12/1999 | Gharda | ................. | G06F 9/4401 713/1 |
| 6,115,471 A * | 9/2000 | Oki | ........................ | G06Q 30/06 380/242 |
| 7,389,273 B2 * | 6/2008 | Irwin | .................... | H04L 9/0825 705/51 |
| 7,797,696 B1 * | 9/2010 | Nallagatla | ................. | G06F 8/65 717/168 |
| 8,914,767 B2 * | 12/2014 | Savant | .................. | G06F 21/121 717/100 |
| 9,055,120 B1 * | 6/2015 | Firman | .............. | G06Q 30/0623 |
| 9,838,250 B1 * | 12/2017 | Ali | ............................ | G06F 8/65 |
| 2004/0193860 A1 * | 9/2004 | Rothman | .............. | G06F 9/4411 713/1 |
| 2013/0231152 A1 * | 9/2013 | Zimmerman | .......... | H01Q 3/005 455/517 |

(Continued)

OTHER PUBLICATIONS

Wayback SCIF (downloaded from https://web.archive.org/web/20140223202221/https://scifglobal.com/scif-definition-what-is-a-scif/, attached as PDF file of screenshot from Wayback machine for date of Feb. 2014), (Year: 2014).*

(Continued)

*Primary Examiner* — James D Nigh
*Assistant Examiner* — Margaret M Neubig
(74) *Attorney, Agent, or Firm* — Zagorin Cave LLP; Robert W. Holland (57) ABSTRACT

A portable information handling system having an NFC device obtains identifier information from information handling systems through NFC and applies the identifier information to obtain license keys for applications stored on the information handling system from a license server through a network interface. NFC transfer of license keys in a secure environment, such as to server information handling system management controller in a data center, provides the convenience of public license servers without the security risk of an open public network access to the management controller.

20 Claims, 3 Drawing Sheets

(56) References Cited

U.S. PATENT DOCUMENTS

2015/0186864 A1\* 7/2015 Jones .................. G06Q 20/322
705/39

OTHER PUBLICATIONS

"How to BIOS", downloaded from https://www.computerworld.com/article/2583113/bios.htmland attached as PDF file, dated Jun. 25, 2001, (Year: 2001).\*

\* cited by examiner

INFORMATION HANDLING SYSTEM LICENSE MANAGEMENT THROUGH NFC

BACKGROUND OF THE INVENTION

Field of the Invention

The present invention relates in general to the field of information handling system license management, and more particularly to an information handling system license management through near field communications (NFC).

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Generally, information handling systems execute applications to perform desired functions. In some instances, information handling systems come preloaded with applications stored in a disabled state so that an end user can bring the application to life by inputting an authorized license key. This saves the end user time and bandwidth since the preloaded applications are stored in persistent memory, such as in a hard disk drive image, as part of the manufacture process and therefore do not require downloading after delivery of an information handling system to the end user. Often enterprises have enterprise-wide license agreements that the application manufacturer charges against as an enterprise brings information handling systems into and out of service. One example of large scale use of such a license arrangement is sometimes found in the large scale deployment of server information handling systems to data centers. Server information handling systems at loaded onto racks in the data center and preloaded with operating system and other applications, such as email applications, virtual machines, etc. . . . that are used by the enterprise. After a server information handling system is loaded and turned on, a data center technician brings applications to life by entering license information though a management controller interface at the location of the server information handling system.

One difficulty with bringing license authentication to a newly-installed server information handling system is that data center security measures often prevent direct communication between a server information handling system management controller and a public licensing server, such as a cloud-based license server. Generally, management controllers have restricted network access so that malicious code cannot root in the server information handling system. Instead of performing the automated process available from on-line licensing resources, the user instead must often manually enter license codes through a baseboard management controller interface. Manual entry of information handling system identifiers, license binding text and license key information tends to include mistyping and inadvertent errors that can lead to installation failure and repeated license binding attempts after an input license key fails to install. Although restricted network access for management controllers does tend to increase system security, manual interfaces with a management controller are often performed with USB memory key devices that have their own security issues related to malware stored on the memory key. Indeed, some data centers restrict the use of thumb drives since a virus installed on a thumb drive may attach to copies of files made from the thumb drive to the most security-sensitive devices of a server information handling system.

A typical cumbersome process used by an information technology administrator to activate a license starts with navigation by the user to a licensing network location where the user enters credentials to access the user's licenses. The user selects the licenses for installation on the server information handling system and enters a service tag or other identifier for the server information handling system to bind the system to a license key. The end user then downloads the license key(s) for the authorized applications, usually storing the license key(s) on a portable storage medium, such as a thumb drive. Generally the end user obtains the license key(s) at a location that allows network access and then brings the license key(s) in a storage device to the data center where network communication is restricted for security reasons. Once inside the data center, the end user attaches the storage device to a target server information handling system, opens the server information handling system configuration graphical user interface accessed through the management controller, navigates to a license import wizard and imports the license key from the storage device to the server. In light of the risks of attaching a thumb drive or other storage media directly to a server information handling system, such a conventional practice of downloading license keys presents dangers similar to those faced by a network accessible data center.

SUMMARY OF THE INVENTION

Therefore, a need has arisen for a system and method which provides an information handling system license key import without a direct physical connection or external network interface.

In accordance with the present invention, a system and method are provided which substantially reduce the disadvantages and problems associated with previous methods and systems for enabling a license for software loaded on an information handling system. License keys retrieved from a public license server to a mobile information handling system are transferred to a target information handling system with an NFC interface. The mobile information handling system acts as a proxy to provide public license server management for preloaded applications on target information handling systems otherwise restricted from public network access.

More specifically, a server information handling system installed in a data center includes an NFC interface controlled by a baseboard management controller (BMC). The BMC tracks application license keys to authorize the use of applications loaded on the server information handling system. In order to maintain security, the BMC has restricted network access that precludes direct communication with public network locations, such as a license server. A portable information handling system, such as a tablet or smartphone, includes a license management application that obtains identifier information from the server information handling system through an NFC interface and obtains license keys from the public license server through a network interface. The license management application provides license keys to the BMC by an NFC transaction so that the BMC may authorize the use of preloaded application. In one embodiment, the license transaction occurs at real time or near real time by using a wireless wide area or other network interface with the portable information handling system to exchange server information handling system identifiers for license keys. In alternative embodiments, asynchronous exchanges of identifiers and license keys are supported with secure sign-in by an authorized user to the license management application.

The present invention provides a number of important technical advantages. One example of an important technical advantage is that a license key is provided to an information handling system with a safe and straightforward workflow. A mobile telephone, tablet or other portable information handling system with NFC capability runs a secure app that accesses a public license server to obtain license keys assigned or assignable to an information handling system, such as a server information handling system in a secure area. Loading the license keys by NFC provides a low power wireless communication alternative that is acceptable in secure areas because of its low signal strength and that prevents the risk of spreading viruses through vulnerable physical storage devices, such as USB keys. The app running on the portable information handling system provides a secure and convenient enterprise-managed solution for assigning license keys that coordinates information technology administrator activities outside of and within a secure area for convenient, accurate and timely license key assignments.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Licenses for applications loaded on a server information handling system are transferred from public license server to a target with an NFC interface in a secure area that precludes a direct network interface between the target and the public license server. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
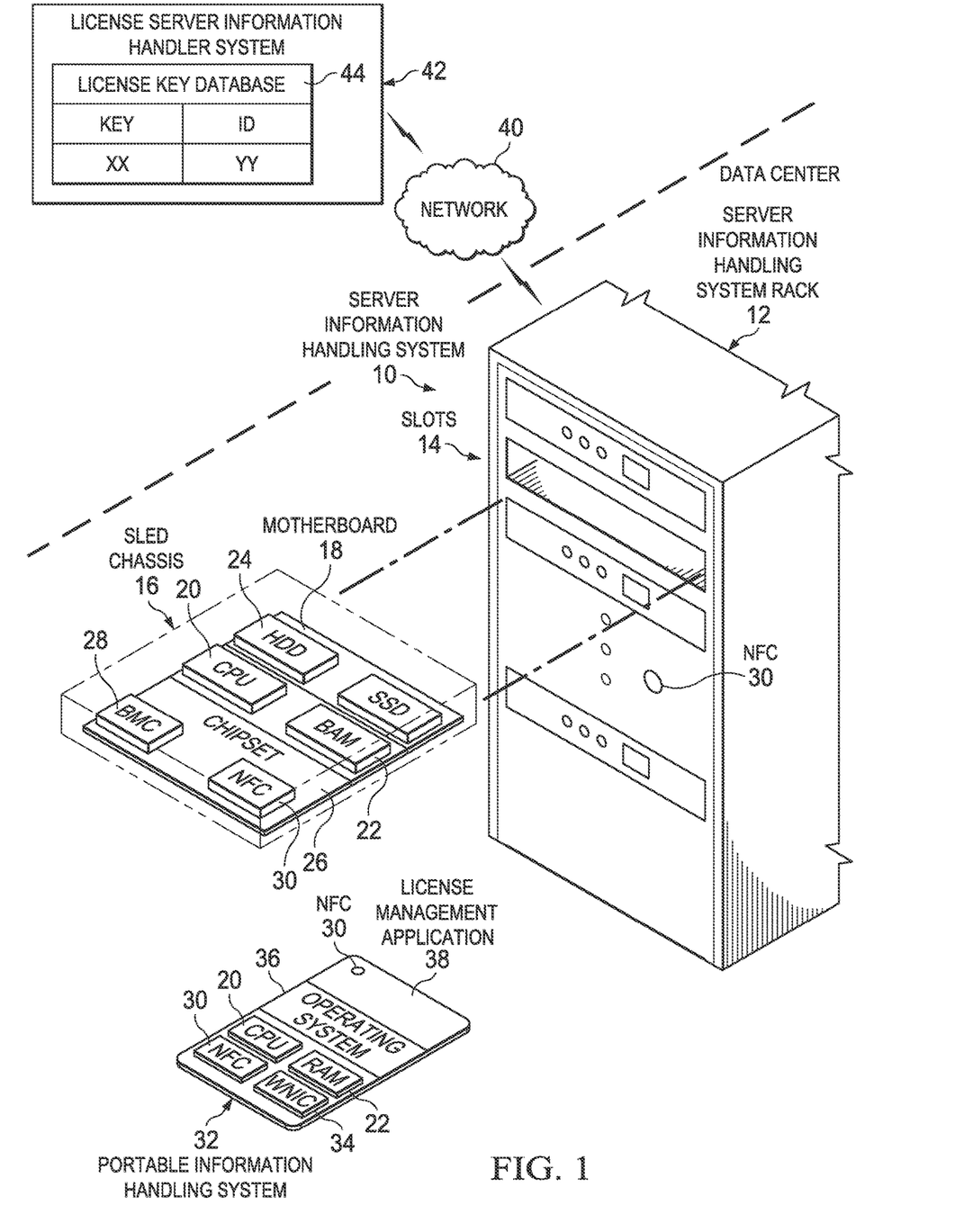
FIG. 1 depicts a block diagram of an example embodiment of a system for managing information handling system licenses distributed from a public network to a secure environment.

Referring now to FIG. 1, a block diagram depicts an example embodiment of a system for managing information handling system licenses distributed from a public network to a secure environment. Plural server information handling systems 10 are distributed data center racks 12 under the physical management of data center administrators. Each rack 12, for example, includes plural slats 14 that accept a sled chassis holding processing components of a server information handling system 10. In alternative embodiments, other types of physical configurations may be used to maintain plural server information handling systems 10 in an operational state in a data center, such as blade configurations. Generally, the data center maintains physical security of the server information handling systems 10 by ensuring that only authorized individuals are allowed in the data center. Maintaining "information" security presents a more complex issue since server information handling systems 10 typically support communications with external networks. One step that does help maintain information security is to restrict sensitive "information" security management functions to require the physical presence of an information technology administrator in the data center. Indeed, some sensitive configuration functions require physical access by the information technology administrator to the server information handling system itself.

In some respects, information security is defined by the hardware, software and firmware that comprise a server information handling system. In the example embodiment, server information handling system 10 has a motherboard 18 disposed in sled chassis 16 that supports one or more central processing units (CPUs) 20 executing instructions in random access memory (RAM) 22 to perform server functions, such as instructions of an e-mail or web application accessed by clients through a network interface. Applications and data are stored in persistent memory, such as hard disk drives (HDD) 24 or solid state drives, and in flash memory within chipset 26, such as option ROMs for hardware devices. Chipset 26 includes a baseboard management controller (BMC) 28 that executes firmware instructions to manage physical cooperation between processing components of server information handling system 10, such as human interface devices (HID), display graphics and network communications. Generally, applications that run over CPU 20 to serve client network requests tend to rely on information security measures while firmware instructions executed by chipset 26 tend to rely on physical security managed through BMC 28. Data center information technology administrators enforce physical security at BMC 28 by restricting access to BMC functionality based upon the type of access through which a functionality is requested. For instance, a BMC 28 may allow a remote restart command from a non-public network, such as a data center local area network, but refuse such commands from public network accesses. Such physical security measures helps to reduce the risk that malicious software may "root" in the firmware so that it has broad information access and is difficult to detect.

One example of a management function that is restricted to non-public, private or direct physical interaction with a BMC is the loading and authorization of software applications for execution on the server information handling system 10. In order to prevent the spread of malicious code, applications are often preloaded in HDDs 24 at manufacture of the information handling system and left in a disabled state, such as by not including a license key needed to authorize execution of the application. BMC 28 includes a table with authorized applications and their license keys so that an information technology administrator can authorize preloaded applications by entering the license key at BMC 28. Manually loading a license key and authorizing an application within a secure data center presents a challenge to information technology administrators since the process is prone to human error, such as mistyped license keys or user identifiers that would usually be downloaded automatically through a public license server that distributes license keys.

To aid information technology administrators in the management of license keys, a near field communication (NFC) device 30 is provided at server information handling system 10 to support NFC transactions with a portable information handling system 32, such as a tablet or smartphone information handling system having its own NFC device 30. Portable information handling system 32 has a CPU 20, RAM 22, NFC device 30 and wireless network interface card (WNIC) 34 to support communications by a license management application 38 running over an operating system 36 through a network 40 with a license server 42. License server 42 has a license key database 44 that provides license keys through a public network interface 40 provided the license key is bound by an authorized user with an appropriate information handling system identifier, such as a service tag. License management application 38 acts as a proxy for BMC 28 to indirectly interact with license server 42 to obtain license keys and authorize use at server information handling system 10 of preloaded applications. Transferring license keys to license management application 38 allows wireless network download of license keys while an administrator is in physical proximity to a server information handling system. Restricting license key transfers to BMC 28 by an NFC transaction ensures that physical security is maintained to perform the license key download since NFC devices 30 have limited range that prevents transfers from outside of physical security. In alternative embodiments, other types of wireless communications may be used in the place of NFC as described herein, such as by performing all or part of the license key updates to the BMC from the portable information handling system with Bluetooth, Bluetooth Low Energy, wireless local area network communications, and high frequency (60 GHz) communications like 802.11(ad).

To perform a license key update, an information technology administrator loads license management application 38 on a portable information handling system that has network access and NFC capability. The administrator then configures license management application 38 with licensing credentials that allow access to a public license service. The administrator obtains model number, service tag unique identifier and licensable feature information from BMC 28 with an NFC transaction, such as by tapping a server information handling system 10 front bezel near its NFC device 30. Once license management application 38 obtains license information from server information handling system 10, it provides the license information and administrator credentials to license server 42 to determine if any licenses are available for the server information handling system 10. In one embodiment, licenses are set beforehand in license server 42 and license keys are provided to license management application 38 based upon the assigned licenses. Alternatively, the information technology administrator retrieves a list of available applications that do not have license keys and selects applications to enable through the license management application. If license keys are available, license server 42 provides the license keys through network 40 to license management application 38, which in turn provides the license keys by NFC transaction to BMC 28 for enabling the selected applications.

In various alternative embodiments, license management application 38 obtains license keys and other information to assist information technology administrators in ensuring correct installation and execution of applications on a server information handling system 10. For example, an information technology administrator may obtain hardware and software configuration information from BMC 28 for use in confirming that an application is correctly configured on a server information handling system. As another example, license management application 38 obtains performance and maintenance records from BMC 28 to ensure that server information handling system 10 does not have a defect that will impact activation of an application before obtaining the license key for the application. Such information may be gathered before or after a license installation is attempted. For example, performance information may be collected upon detection of a license installation failure and then provided to the service personnel to further trouble shoot license installation failures. The performance records may include usage patterns and firmware versions for option ROMs that are compared against an application before the application receives a license key so that the application and/or firmware are compatible. As yet another example, license management application 38 operates in secure data centers without an active wireless network interface by caching either server identifier information or license keys. For example, an administrator obtains identifiers from one or more server information handling systems within a secure area, exits the secure area to obtain license keys through a network interface, and then returns to the secure area to put the license keys in each BMC with an automated NFC transaction. Alternatively, the administrator uses credentials to obtain license keys before entering the secure area, such as temporary identifiers provided to license server 42 as placeholders. The administrator then enters the secure data center area to transfer the license keys with NFC transactions and obtain identifiers so that the identifiers are later sent as updates to the license server in the place of the temporary identifiers.

Figure 2:
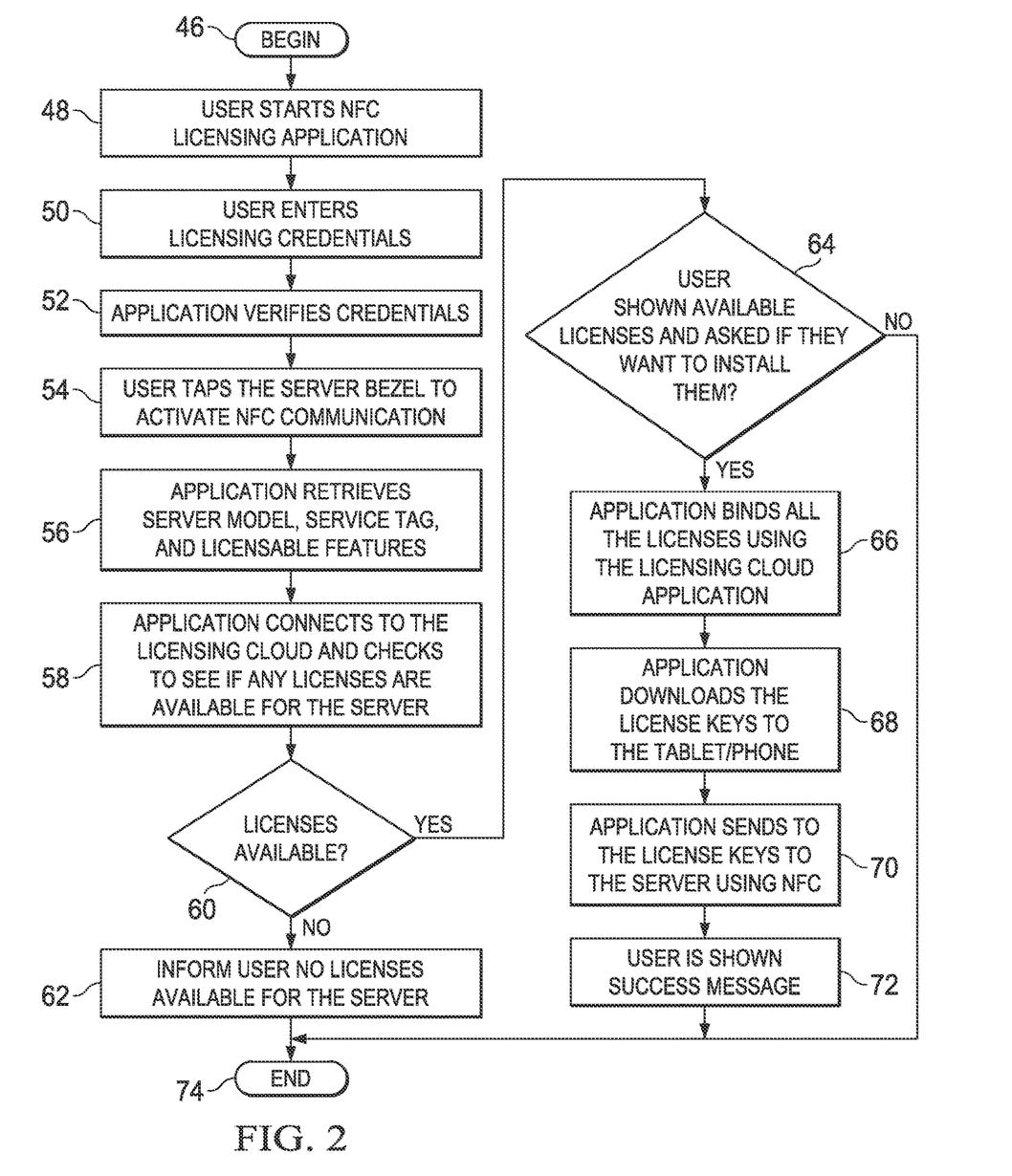
FIG. 2 depicts a flow diagram of an example embodiment of a process for distributing license from a public network to information handling systems disposed in a secure environment.

Referring now to FIG. 2, a flow diagram depicts an example embodiment of a process for distributing license from a public network to information handling systems disposed in a secure environment. The process starts at step 46 with a portable information handling system having a license management application and continues at step 48 with the end user starting the license management application. At step 50, the end user enters licensing credentials, such as a user name and password, and at step 52 the license management application verifies the credentials. At step 54, the end user taps a server information handling system bezel to activate an NFC transaction that allows the license management application at step 56 to retrieve server model number, service tag and licensable features. At step 58, the license management application connects to a public license networking cloud (or other license key resource) and checks to see if any licenses are available for the server information handling system. At step 60, the license server determines if license are available and, if not, continues to step 62 to tell the user that no licenses are available and to step 74 to end.

If at step 60 licenses are available, then the process continues to step 64 to show the available licenses to the end user and request that the user input which licenses to install. If none are selected at step 64, the process ends at step 74. If the user selects licenses at step 64, the process continues to step 66 so the license management application can bind the selected licenses with the system identifier using an application programming interface (API) of the license server. At step 68, the license server downloads the license keys through the public network interface to the license management application. At step 70, the license management application sends the license keys to the server BMC by NFC transaction so that the BMC configures the applications to execute as approved applications. At step 72, the user is shown a confirmation message that the license configuration is complete.

Figure 3:
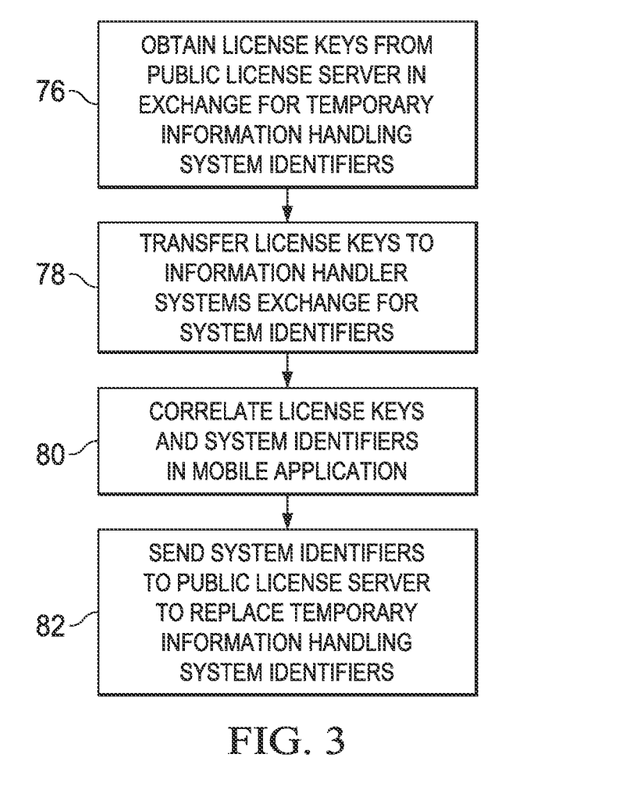
FIG. 3 depicts a flow diagram of another example embodiment of a process for distributing license from a public network to information handling systems disposed in a secure environment.

Referring now to FIG. 3, a flow diagram depicts another example embodiment of a process for distributing license from a public network to information handling systems disposed in a secure environment. At step 10, an administrator obtains license keys from a public license server in exchange for temporary identifiers authorized for use by the administrator. At step 78, the administrator transfers the license keys to one or more information handling systems in exchange for a system identifier from the information handling systems. At step 80, the license management application correlates the license keys and system identifiers to track the temporary assignments, which may expire if not made permanent within a required time frame. At step 82, once the end user has access to a public network, the end user sends the stored system identifiers and their associated license keys to the public license server in order to replace and release the temporary identifiers used to authorize the license keys. In this manner, an administrator may use the license management application although a network interface is not available in a secure data center.

Although the present invention has been described in detail, it should be understood that various changes, substitutions and alterations can be made hereto without departing from the spirit and scope of the invention as defined by the appended claims.

What is claimed is:

1. A system for executing information handling system preloaded applications at an information handling system storing the preloaded applications, the system comprising:
  a license server interfaced with a non-private network and operable to distribute one or more license keys for one or more applications in response to receiving license credentials, the one or more license keys operable to install at an information handling system to authorize one or more functions of the one or more applications;
  a portable information handling system having a near field communication (NFC) interface and a network interface, the network interface operable to access the non-private network from a secure environment, the secure environment restricting management controllers from communicating with the non-private network;
  a license management application deployed to the portable information handling system and operable to provide the license credentials to the license server through the network interface, retrieve the one or more license keys from the license server through the network interface, and transfer the one or more license keys to the information handling system through the NFC interface to authorize the one or more functions; and
  a management controller integrated in the information handling system and having performance information of the information handling system to detect defects, the performance information including at least usage patterns and firmware versions for option ROMs, the management controller having a network interface excluded from communication outside the secure environment and with the non-private network to prevent direct communication between the license server and management controller;
  wherein the license management application restricts communication of the one or more license keys to the management controller if the management controller indicates defects of the information handling system determined from the performance information by comparing the usage patterns and firmware versions for the option ROMs against the one or more applications associated with the one or more license keys to find that the one more applications and the option ROMs are incompatible.

2. The system of claim 1 wherein the network interface comprises a wireless wide area network interface accessible by a smartphone information handling system.

3. The system of claim 2 wherein the license management application communicates in the order of: first obtaining identifier information for the information handling system through the NFC interface, second sending the identifier information as at least part of the credentials to the license server by the network interface, third receiving license keys from the license server through the network interface, and fourth sending the license keys to the information handling system through the NFC interface.

4. The system of claim 1 wherein the license management application communicates in the order of: first obtaining license keys from the license server by the network interface, second sending the license keys to the information handling system by the NFC interface, third obtaining identifier information for the information handling system through the NFC interface, and fourth sending the identifier information as at least part of the credentials to the license server.

5. The system claim 1 wherein the license management application communicates in the order of: first obtaining license keys from the license server by the network interface, second obtaining identifier information for the information handling system through the NFC interface, third sending the license keys to the information handling system by the NFC interface , and fourth sending the identifier information as at least part of the credentials to the license server.

6. The system of claim 5 wherein the network interface comprises a wireless local area network interface.

7. The system of claim 1 wherein the license management application is further operable to retrieve configuration information of the information handling system through the NFC interface and apply the configuration information to verify compatibility with the one or more applications before transfer of the one or more license keys.

8. The system of claim 7 wherein the configuration information comprises a BIOS version.

9. A method for executing applications at an information handling system by providing the information handling system application licenses, the method comprising:
operating the information handling system in a secure environment that restricts direct communication between the information handling system and a license server to activate one or more of the applications on the information handling system with license keys provided by the license server;
providing license credentials to a license server from a portable information handling system through a network interface with a public network;
retrieving one or more license keys from the license server through the public network interface to the portable information handling system in response to the license credentials;
retrieving performance information from a management controller of the information handling system to the portable information handling system, the performance information of a type that can be indicative of one or more defects at the information handling system that may prevent execution of an application including at least usage patterns and firmware versions for option ROMs;
comparing the usage patterns and firmware versions for the option ROMs against the one or more of the applications for compatibility before receiving license keys for the one or more applications; and
transferring the one or more license keys to the information handling system through an NFC interface between the portable information handling system and the management controller to authorize one or more functions of an application stored on the information handling system if the performance information determined from the comparing indicates compatibility of the option ROMs and the one or more applications.

10. The method of claim 9 wherein providing license credentials to a license server further comprises:
retrieving information handling system identifier information from the information handling system to the portable information handling system through the NFC interface; and
providing the information handling system identifier information to the license server as part of the license credentials.

11. The method of claim 10 further comprising:
retrieving the information handling system identifier information before the providing license credentials; and
providing the information handling system identifier information as license credentials before the retrieving one or more license keys.

12. The method of claim 10 further comprising:
retrieving the information handling system identifier information after the providing the license credentials; and
providing the information handling system identifier information as part of the license credentials after the transferring the one or more license keys.

13. The method of claim 9 wherein the license credentials include a temporary information handling system identifier, the method further comprising:
authorizing the transferring the one or more license keys in response to a transfer by the NFC interface of an information handling system identifier from the information handling system to the portable information handling system; and
completing a license for the one or more applications by sending the information handling system identifier to the license server to replace the temporary information handling system identifier.

14. The method of claim 13 further comprising:
monitoring at the license server the temporary information handling system identifier; and
canceling the license key associated with the temporary information handling system identifier if not replaced by the information handling system identifier in a predetermined time.

15. The method of claim 9 further comprising:
retrieving information handling system identifier information from the information handling system to the portable information handling system by the NFC interface to provide to the licensing server as license credentials;
retrieving configuration information from the information handling system; and
verifying compatibility of the configuration information and one or more applications authorized by the one or more license keys.

16. The method of claim 9 further comprising preloading one or more applications on the information handling system at manufacture, the one or more applications authorized by the one or more license keys.

17. A portable information handling system configured to enable applications stored on an external information handling system located in a secure environment, the portable information handling system comprising:
a processor;
memory;
a network interface device operable to support communications with a network;
a near field communications (NFC) device operable to support NFC with an external NFC device; and
a license management application stored in the memory and operable to execute instructions on the processor to:
provide license credentials to a license server through the network interface device;
retrieve one or more license keys from the license server through the network interface device in response to the license credentials;
retrieve from an external information handling system through an NFC interface performance information of the external information handling system, the performance information indicative of one or more defects at the external information handling system and including at least usage patterns and firmware versions for option ROMs;
compare the usage patterns and firmware versions for the option ROMs against the one or more applications so that the one or more applications are compatible with the firmware before retrieving the license keys from the license server for the one or more applications; and
transfer the one or more license keys to the external information handling system through an NFC interface to authorize one or more functions of one or more applications stored on the information handling system if the performance information does not indicate the one or more defects, the one or more defects associated with failure of the application to execute on the external information handling system, the external information handling system restricted from direct communication with the license server by the secure environment.

18. The portable information handling system of claim 17 wherein the license management application instructions are further operable to:
   retrieve information handling system identifier information from the external information handling system through the NFC interface; and
   provide the information handling system identifier information to the license server as part of the license credentials.

19. The portable information handling system of claim 18 wherein the license management application instructions are further operable to:
   retrieve information handling system identifier information before providing license credentials; and
   provide the information handling system identifier information as license credentials before the retrieving one or more license keys.

20. The portable information handling system of claim 18 wherein the license management application instructions are further operable to:
   retrieve the information handling system identifier information after providing license credentials to the external information handling system; and
   provide the information handling system identifier information as license credentials after the transferring the one or more license keys to the external information handling system.

* * * * *